April 3, 1928.
C. L. DEWEY
1,664,402
METHOD OF AND MEANS FOR DECORATING FISH LURES
Filed Nov. 4, 1925
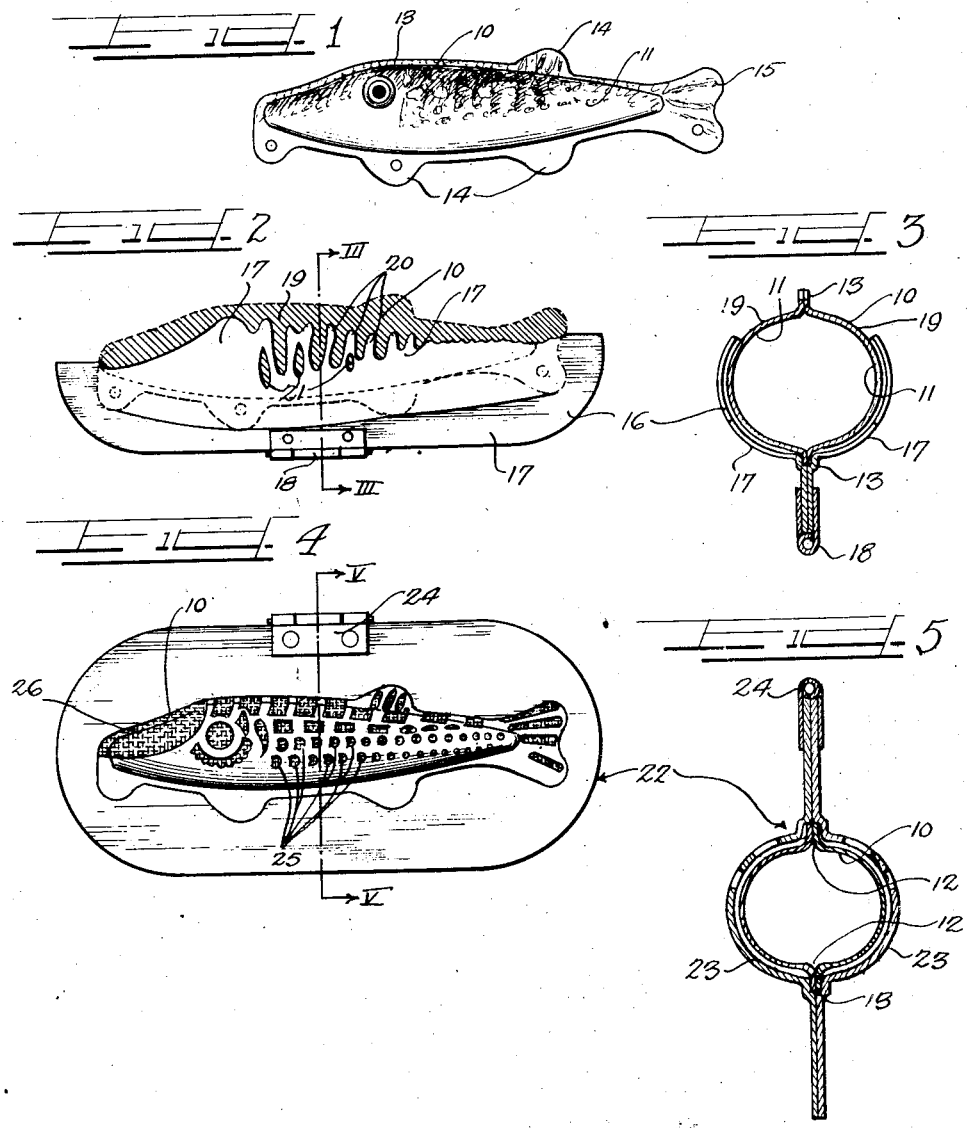

Patented Apr. 3, 1928.

1,664,402

UNITED STATES PATENT OFFICE.

CLARENCE L. DEWEY, OF ELKHART, INDIANA.

METHOD OF AND MEANS FOR DECORATING FISH LURES.

Application filed November 4, 1925. Serial No. 66,704.

One of the objects of the invention is to provide an improved method of and means for decorating lures to cause them to closely resemble small fish in appearance.

Another object is to provide a method of applying a plurality of coats of coloring matter to the fish structure and blend the outlines so that there will be no distinctive demarcation between them, the better to imitate the appearance of the natural object.

Other objects, advantages and benefits arising from my invention will be clearly understood from a consideration of the following description when taken in conjunction with the accompanying drawings, wherein:—

Figure 1 is a side elevation of a completely decorated lure made in accordance with my invention;

Figure 2 is a side elevation of a shield for containing a lure in carrying out a part of the method of procedure to be hereinafter described;

Figure 3 is a section taken on line III—III of Figure 2;

Figure 4 is another shield enclosing the lure for application of the second colored coating, shielding selected parts upon which the first coating has been applied; and Figure 5 is a section taken on line V—V of Figure 4.

In all of the views the same reference characters are used to indicate similar parts.

As shown on the drawings:

The reference numeral 10 indicates the body of the lure having the general configuration of a small fish. In the particular instance it is made of two like halves 11—11 of sheet metal soldered together between the meeting edges 12 to form ribs 13, fins 14 and tail 15. The body is generally round in cross section, as more clearly shown in Figs. 3 and 5.

The body, as described, may first be painted uniformly with a cover coating, say for example, white. It is then desirable to color selected parts of the body in imitation of scales, stripes and blotches indigenous to the type of fish to be imitated.

To produce these effects I provide a shield structure comprising two like hollow members 17—17 hinged together at 18. The upper part of these members are cut away exposing the upper part of the fish body 19, leaving a sawtooth edge 20 and perforations 21—21.

The exposed part of the body, exposed by the shield, is sprayed with green coloring liquid or other suitable color. This leaves the lower part or belly white and the upper part or back green in places.

When the body dries it is then placed in the shield device 22 which consists of two like perforated members 23—23, hinged together at 24. The members when together are substantially circular in cross section, more clearly shown in Figure 5.

The members 23 are perforated at 25 in imitation of rows of scales and at other places.

When the body 10 is in the shield device 22 it is sprayed through these openings with a contrasting color or with gold or silver paint and the nose part 26 may be sprayed red.

Other additional like shields and more coats of paint may be used to lend greater variety of effects in line with this invention.

It will be observed that the body 10 is held uniformly spaced away from the shield members. The reason for this is to produce a more or less indefinite line of demarcation between the outlines of the different coatings of paint and to cause one color to blend into the other to produce a more pleasing effect and a more life-like appearance.

I am aware that many changes may be made, and numerous details of construction may be varied through a wide range without departing from the principles of this invention, and I therefore do not purpose limiting the patent granted hereon, otherwise than necessitated by the prior art.

Having described my invention what I claim as new and desire to secure by Letters Patent is:—

1. The method of decorating fish lures which includes shielding parts of the body of a lure; spraying the exposed parts thereof with a coloring liquid; shielding other parts of the body and some parts that have been previously colored; spraying all of the exposed parts with another distinctively colored liquid and removing the shield from the body.

2. The art of decorating a fish lure body which includes spraying a colored liquid on the body through a perforate shield out of contact with the body and subsequently spraying another, contrasting, colored liquid on the body through a shield having perforations substantially out of register with the perforations in the first shield and out of contact with the body whereby to render the outlines of said colors indistinct.

3. A spraying shield for use in decorating a fish lure body to be embellished comprising two complementary perforated shield members hinged together, between which to contain said body and means for holding the body spaced away from the shield members.

4. Means for decorating a fish lure body comprising two complementary perforated shield members hinged together, between which to contain said body, said members being perforated; means to hold said body spaced away from said shield members and another like shield device having differently located perforations through which to spray the body after the first spraying operation.

In testimony whereof I have hereunto subscribed my name.

CLARENCE L. DEWEY.